United States Patent [19]

Lambertus

[11] Patent Number: 5,518,439
[45] Date of Patent: May 21, 1996

[54] PROCESS AND APPARATUS FOR THE FINISH GRINDING OF CUTTING TOOLS OF A GRANULATING DEVICE

[75] Inventor: Friedrich Lambertus, Stuttgart, Germany

[73] Assignee: Werner & Pfleiderer GmbH, Stuttgart, Germany

[21] Appl. No.: 229,027

[22] Filed: Apr. 18, 1994

[30] Foreign Application Priority Data

May 17, 1993 [DE] Germany .......................... 43 16 478.1

[51] Int. Cl.⁶ .................................................. B24B 1/00
[52] U.S. Cl. ............................ 451/45; 451/278; 451/260; 451/293; 451/374; 451/451
[58] Field of Search ........................... 451/41, 45, 48, 451/56, 278, 280, 259, 260, 293, 374, 451, 455

[56] References Cited

U.S. PATENT DOCUMENTS

| | | | |
|---|---|---|---|
| 1,129,059 | 2/1915 | Bates | 51/161 |
| 3,343,213 | 9/1967 | Fritsch | 18/20 |
| 3,665,658 | 5/1972 | Warwick | 51/288 |
| 3,889,425 | 6/1975 | Miyamoto | 451/293 |
| 3,932,967 | 1/1976 | Hanes | 451/45 |
| 4,182,084 | 1/1980 | Fridenberg | 51/161 |
| 4,285,169 | 8/1981 | Franklin | 51/288 |
| 4,728,275 | 3/1988 | DiLullo | 425/67 |
| 4,779,603 | 10/1988 | Crocetti | 451/458 |
| 5,017,119 | 5/1991 | Tokoi | 425/142 |
| 5,216,846 | 6/1993 | Takahashi | 451/278 |
| 5,241,794 | 9/1993 | Pedersen et al. | 451/48 |

FOREIGN PATENT DOCUMENTS

| | | |
|---|---|---|
| 1918439 | 6/1965 | Germany . |
| 2646309 | 2/1980 | Germany . |

Primary Examiner—Bruce M. Kisliuk
Assistant Examiner—Eileen P. Morgan
Attorney, Agent, or Firm—Ladas & Parry

[57] ABSTRACT

A process and apparatus for the finish grinding of cutting blades of a cutting tool head of a granulating device for thermoplastic material in which a grinding wheel is supported for rotation about a vertical axis with a grinding surface of the grinding wheel facing upwardly and the cutting blades of the cutting tool head rest on the grinding surface of the cutting tool head under the weight of the grinding wheel. The cutting tool head is free for vertical movement and is precisely aligned with the axis of rotation of the grinding wheel. The grinding wheel is driven by a motor around a vertical axis to grind the cutting surfaces of the cutting blades and produce precision ground surfaces on the blades which are aligned in a common plane.

17 Claims, 2 Drawing Sheets

PROCESS AND APPARATUS FOR THE FINISH GRINDING OF CUTTING TOOLS OF A GRANULATING DEVICE

FIELD OF THE INVENTION

The invention relates to a process and apparatus for the finish grinding of cutting tools in a cutting tool head of a granulating device for thermoplastic material.

BACKGROUND AND PRIOR ART

Granulating devices are known for producing granulates of thermoplastic material by means of rotatable cutting tools which cut strands of material discharged from a die plate. Generally, the cutting of the plastic strands is carried out under water. The die plate is fixed to a granulating head connected to an extruder of the plastic material, the material passing from the extruder through the granulating head to nozzles or orifices in the die plate from which the strands of material are discharged and cut by the cutting tool.

Also known are means for grinding the cutting surfaces of the cutting tools of said granulating devices so that the cutting surfaces are disposed in a common plane parallel to the surface of the die plate from which the strands of plastic material are discharged.

DE-GM 1 918 439 discloses such a grinding means in which the tool head of the cutting blades is maintained stationary and a rotating grinding wheel grinds each cutting blade individually. Thereby, an accurate coplanar, parallel relation of the cutting surfaces of the blades relative to the surface of the die plate is not initially achieved by this arrangement. Therefore, in order to achieve the desired coplanar, parallel relation of the cutting surfaces of the blades with the surface of the die plate, the cutting head is applied with slight pressure against the surface of the die plate.

In this way, the cutting surfaces of the cutting tools are collectively brought into precise planar parallel relation with the surface of the die plate and deviations in the rotating cutting tool head caused by given tolerances are equilibrated. This is necessary in order to obtain a satisfactory shearing of the molten, plastic strands discharged from the outlets of the nozzles in the dip plate.

Additionally, a new adjustment of individual cutting tools is required after they have been replaced and this is conducted, in the same way, for equilibration with the die plate. This, so-called "cutting-in" operation, however is very time consuming and requires a shutdown of granulate production which may last for several hours.

It is also known that ideal conditions for granulating plastics and similar materials are obtained during the cutting process only if all the cutting tools are applied with their entire bearing surfaces at a uniform prestress, adapted to the properties of the product, against the entire front surface of the die plate swept by the cutting tools.

The conventional means of arranging the front surface of the die plate and the cutting surface of the cutting tools strictly parallel and coplanar to one another and of pressing the cutting tools with defined force against the die plate are not sufficient to obtain a planar, parallel relation of the cutting tools under identical prestress at the die plate.

In addition to the time-consuming effort in the known "cutting-in" process, a process and a device are disclosed in the unpublished German Patent Application P 4,221,776, which allows the cutting tool head to rotate at a predetermined angular velocity in order to simultaneously cut all cutting surfaces of the cutting tools by a fine adjustment against a grinding wheel or plate. As a result, the planar, parallel relation of the cutting tools relative to the surface of the die plate necessarily involves high precision for the fine adjustment of the cutting tools against the grinding wheel. For this purpose, a complex system and a considerable financial expenditure is necessary.

SUMMARY OF THE INVENTION

An object of the invention is to provide a process and apparatus for adapting the cutting surfaces of the cutting tools to the surface of the die plate in a simple way without the need for precision adjustment of external apparatus as in the known art.

A further object of the invention is to provide such a process and apparatus in which the tool head is slidingly inserted into a support means and it automatically positions itself for finish grinding of the cutting tools by a grinding wheel so that the cutting surfaces of the cutting tools will be in a common plane capable of parallel, coplanar contact with the surface of the die plate.

A further object of the invention is to achieve the automatic positioning of the tool head by the action of gravity.

In order to satisfy the above and further objects of the invention, a process is provided in which a grinding wheel is supported for rotation about a vertical axis such that a grinding surface of the grinding wheel faces upwardly; the cutting blades of a cutting tool head are then rested on the grinding surface of the grinding wheel under the weight of the cutting tool head in a position in which the cutting tool head is coaxial with the grinding wheel; thereafter the grinding wheel is rotated around said vertical axis to grind the cutting blades and produce precision, ground surfaces of the blades which are aligned in a common plane.

The invention also provides apparatus which comprises a grinding wheel having a grinding surface, means for supporting said grinding wheel for rotation about a vertical axis with said grinding surface facing upwardly, means for supporting a cutting tool head coaxially with said grinding wheel and with cutting blades of said cutting tool head resting on said grinding surface under the weight of the cutting tool head, and drive means for rotating said grinding wheel in rotation around said vertical axis to grind the cutting blades and produce precision, ground surfaces on said blades which are aligned in a common plane.

It has been surprisingly found that planar, parallel grinding of the cutting surfaces of the cutting tools can be obtained with high precision at low cost in a relatively short time, by supporting the cutting tool head on the rotating abrasive wheel by its own weight.

A feed motion for the tool head is eliminated, and the optimal grinding pressure is adjusted automatically in a precise manner. In addition, the necessary registration of the cutting tool head and the abrasive wheel is advantageously obtained.

The grinding pressure produced by the weight of the cutting tool head is automatically obtained and a finished grinding operation is produced in a relatively short time on the cutting surfaces of the cutting tools. The degree of finish grinding can be determined by conventional measurement.

A precise, concentric positioning of the cutting tool head relative to the abrasive grinding wheel is obtained by providing two parallel, vertical bores in a cross beam of a frame into which alignment pins on the tool head are slidably inserted. In this way, it is assured that the cutting tools uniformly rest on the grinding wheel in a concentric alignment therewith so that when the cutting surfaces are ground, they will be disposed in a common plane adapted to the surface of the die plate.

In the apparatus of the invention, a support table supports the drive means for the grinding wheel and is rigidly connected with support means for the cutting tool head as a stable unit avoiding uncontrolled vibration.

In further accordance with the invention, the cutting tool head is provided with an axial bore in which is secured a stem of a carrier unit, the stem having a crown on which said alignment pins are fixed. The alignment pins are slidable in the vertical bores in the cross beam to enable the cutting tool head to be freely slidable vertically thereby allowing it to rest on the grinding wheel under its own weight. By virtue of the free moving engagement of the cutting tool head in the frame and the precision placement of the alignment pins in the bores, the cutting tool head will be accurately positioned and not subject to jamming. A clearance is provided between the top of the crown and the underside of the frame to provide sufficient free vertical movement of the cutting tool head.

According to a feature of the invention, the grinding wheel includes a portion with a grinding surface facing the cutting tools which is inclined slightly away from the cutting tools in a direction radially outwards from the axis of rotation of the grinding wheel. As a result, the ground surfaces of the cutting tools will adapt themselves to the surface of the die plate by the resilience of the cutting tools under the pressure of the tools against the die plate. Thus, during operation, the cutting surfaces of the tools will be disposed in a common plane parallel to the surface of the die plate.

BRIEF DESCRIPTION OF THE FIGURE OF THE DRAWING

DETAILED DESCRIPTION OF PREFERRED EMBODIMENTS OF THE INVENTION

Figure 1:
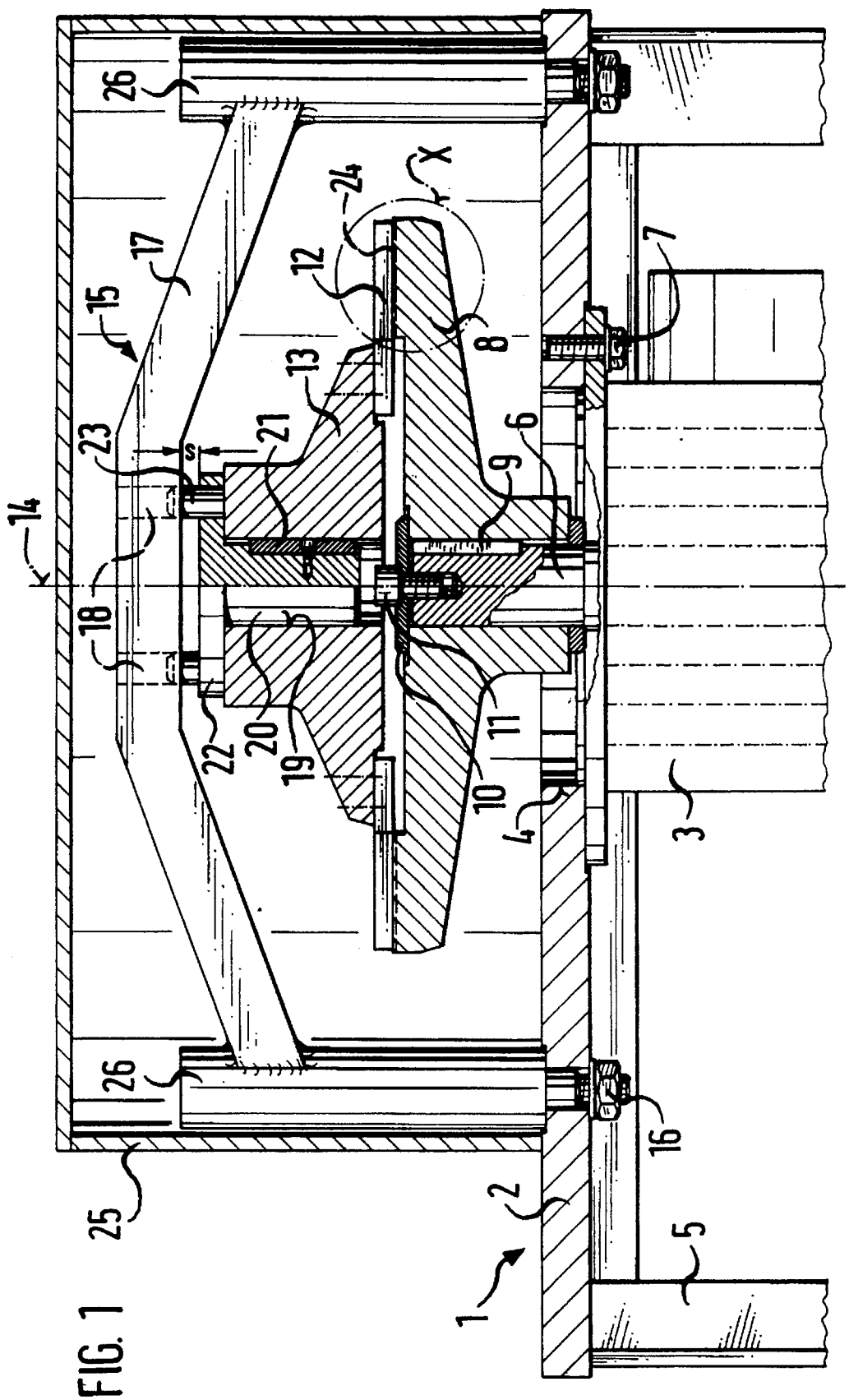
FIG. 1 is a side, elevational view, partly in section and partly broken away, of one embodiment of the apparatus of the invention.

Referring to the drawing, therein is seen a support table 1 having an upper, rigid plate 2 to which is secured a drive motor 3 by detachable fasteners 7. The plate 2 is provided with a hole 4 through which passes a drive shaft 6 of the drive motor 3. The table 1 is provided with supports 5 at opposite sides thereof and the drive motor 3 is disposed beneath the surface of the plate 2 in the space between the supports 5.

The drive motor 3 is a commercial AC motor provided with a bearing support (not shown) for the drive shaft 6 to enable the shaft to be driven in rotation with virtually no play. The drive motor 3 is driven at a speed of rotation to achieve grinding in a manner as will be explained hereafter.

Figure 3:
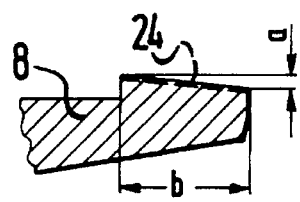
FIG. 3 illustrates a portion of the grinding wheel in FIG. 1 according to a modified embodiment of the invention.

Attached to the drive shaft 6 of the drive motor 3 is a grinding plate or wheel 8. The grinding wheel 8 is connected to the drive shaft for common rotation therewith by suitable means, for example by a key 9 on the shaft 6 engaged in a slot in the wheel 8. The grinding wheel 8 is secured on the drive shaft 6 by a bolt 11 threadably engaged in the drive shaft 6 and bearing against a lock washer 10. The grinding wheel 8 has an annular grinding surface 24 which faces upwardly. The grinding surface 24 can be formed by an abrasive lining on the grinding wheel. In FIG. 1 the grinding surface 24 lies in a horizontal plane whereas in FIG. 3 the grinding surface is very slightly inclined downwardly from the horizontal in a radially outward direction. The inclination a of the grinding surface is approximately equal to 0.001×b.

Figure 2:
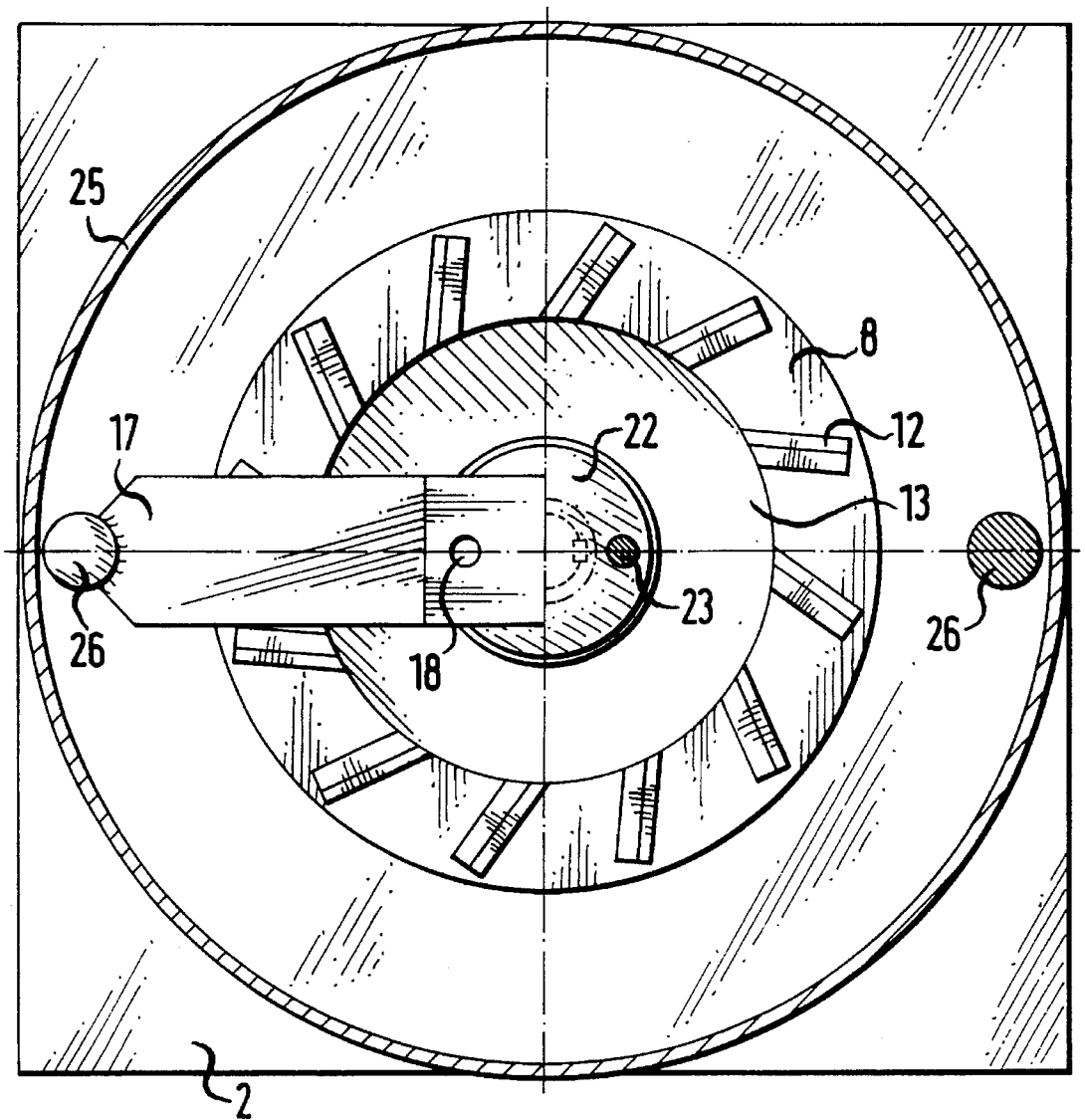
FIG. 2 is a top, plan view of the apparatus in FIG. 1 partly in section and partly broken away.

The grinding surface 24 of the grinding wheel 8 serves for a finish grinding of cutting tools 12 in a cutting tool head 13 of a conventional granulating device for producing granulates of plastic material. The cutting tools 12 are in the form of blades, which as shown in FIG. 2, are uniformly arranged around the axis of rotation of the head and inclined relative to lines extending radially from said axis of rotation. The finish grinding of the cutting surfaces of the cutting tools 12 is intended to produce precision, ground surfaces of the blades in a common plane so that when the cutting tool head is installed in the granulating device, the common plane containing the cutting surfaces of the blades will be parallel to the surface of a die plate with which the cutting blades cooperate. In this respect, during operation of the granulating device, the cutting tool head rotates and the cutting blades cut strands of thermoplastic material which are discharged through outlets of orifices in the die plate. The very slight inclination of the cutting surfaces produced by the grinding wheel illustrated in FIG. 3 will allow the cutting blades to undergo resilient deformation when the cutting blades are pressed against the surface of the die plate with slight pressure during the cutting operation.

In order to achieve accurate grinding of the cutting surfaces of the cutting tools, the grinding wheel 8 is precisely arranged for rotation about longitudinal axis 14 of drive shaft 6 of the drive motor 3. Namely, the cutting tool head 13 which carries the cutting tools 12 is supported by a support means 15 in coaxial relation with the axis of rotation 14 of the drive shaft 6.

In order to achieve this, the support means 15 is in the form of a frame having rigid posts 26 securely fastened to plate 2 of table 1 by bolts 16. A cross beam 17 is rigidly fixed to the posts 26 and is provided with precision guide bores 18 located at equal distances from the axis of rotation 14. The frame and posts of the support means 15 are preferably of steel construction of commercially available profiled steel members which are welded together to provide the necessary rigidity for the frame.

The cutting tool head 13 is provided with an axial bore 19 by which the cutting tool head is supported for rotation in the granulating device. The engagement of the cutting tool head with the support means 15 is obtained by engagement of a carrier unit 20 in the bore 19 of the tool head 13. The carrier unit 20 includes a stem which is secured for common rotation with the tool head 22 within the bore of the tool head by means of a key 21 fixed to stem 20 and engaged in a slot in tool head 13. A crown 22 of the carrier unit is fixed to the stem 20 and alignment pine 23 are precisely secured to the crown 22 at equal distances from the axis 14. The alignment pins 23 serve as guide means which engage in the guide bores 18 in the cross beam 17 of support means 15. A clearance s remains between the upper surface of the crown 22 and the lower surface of the cross beam 17 to provide free support for the cutting tool head 13 on the grinding wheel 8 under the weight of the cutting tool head 13.

In order to engage the cutting tool head 13 on the grinding wheel 8, the bolts 16 are loosened and the frame of the support means 15 is raised to enable the cutting tool head 13 to be brought into position above the grinding wheel 8. The cutting tool head 13 is allowed to rest on the grinding wheel 8 after which the frame is lowered and the bores 18 in the cross beam 17 are aligned with the alignment pins 23 to receive the same. The bolts 16 are then tightened. The tool head 13 now rests by its own weight on the grinding wheel 8 and is unrestrained in its vertical movement while being precisely in coaxial alignment with the drive shaft 6 of the drive motor 3 and thereby with the axis of rotation 14 of the grinding wheel 8.

A hood 25 rests on plate 2 and provides safety during the grinding operation. A conventional safety switch (not shown) is provided between the hood 25 and the plate 2 so that the drive motor 3 can be actuated only when the hood 25 is placed upon the table 1. The hood 25 surrounds the grinding wheel 8 and the cutting tool head 13.

The apparatus of the invention is characterized by a simple construction which provides support of the cutting tool head 13 on the grinding wheel 8 solely under the weight of the cutting tool head itself while precisely positioning the cutting tool head in axial alignment with the grinding wheel so that when the grinding wheel undergoes rotation, it will produce finish grinding of the cutting surfaces of the cutting blades 12 in a common plane so that when the cutting tool head 13 is mounted in the granulating device on a drive shaft fitted in the bore 19, the cutting surfaces of the cutting blades 12 will be in a plane parallel to the precision surface of the die plate from which the strands of plastic material are discharged.

The provision of the guide bores 18 and the alignment pins 23 allows the cutting tool head to rest with uniform pressure via the surfaces of the cutting blades to achieve the desired precision grinding.

Although the invention has been disclosed in relation to specific embodiments thereof, it will become apparent to those skilled in the art that numerous modifications and variations can be made within the scope and spirit of the invention as defined in the attached claims.

What is claimed is:

1. A process for the finish grinding of cutting blades of a cutting tool head of a granulating device for thermoplastic material comprising:

supporting a grinding wheel for rotation about a vertical axis such that a grinding surface of said grinding wheel faces upwardly, resting cutting blades of a cutting tool head on the grinding surface of the grinding wheel solely under the weight of the cutting tool head, guiding the cutting tool head for free vertical movement coaxially with the grinding wheel, and rotating the grinding wheel around said vertical axis to grind the cutting blades resting wherein, at a pressure produced by the weight of the cutting tool head, and produce precise, ground surfaces of the blades which are aligned in a common plane.

2. A process as claimed in claim 1, comprising forming said grinding surfaces with slight inclination relative to the horizontal.

3. A process as claimed in claim 1, comprising forming said grinding surface as an annular surface coaxially around said vertical axis of the grinding wheel.

4. A process as claimed in claim 1, wherein said cutting blades rest on the grinding surface of the guiding wheel solely under the weight of the cutting tool head by providing no external vertical support for said cutting tool head and allowing the cutting tool head to rest on said grinding surface via said cutting blades.

5. A process as claimed in claim 1, wherein the cutting tool head is guided coaxially with the grinding wheel for free vertical movement by slidably engaging a plurality of pins on said cutting tool head in vertical openings in a fixed structure.

6. Apparatus for the finish grinding of cutting blades of a cutting tool head of a granulating device for thermoplastic material comprising:

a grinding wheel having a grinding surface, means for supporting said grinding wheel for rotation about a vertical axis with said grinding surface facing upwardly, guide means for maintaining a cutting tool head coaxially with said grinding wheel and with cutting blades of said cutting tool head freely resting on said grinding surface solely under the weight of the cutting tool head, said guide means providing free vertical movement of said cutting tool head without supporting any weight of the cutting tool head, and drive means for rotating said grinding wheel in rotation around said vertical axis to grind the cutting blades and produce precision, ground surfaces on said cutting blades which are aligned in a common plane.

7. Apparatus as claimed in claim 6, comprising a removable hood enclosing said cutting tool head.

8. Apparatus as claimed in claim 7, wherein said guide means comprises a frame in which said cutting tool head is guided for said vertical movement.

9. Apparatus as claimed in claim 8, wherein said means supporting said grinding wheel comprises a support table, said frame being secured to said table and disposed within said hood.

10. Apparatus as claimed in claim 9, wherein said drive means is secured to said table below said grinding wheel.

11. Apparatus as claimed in claim 10, wherein said frame is detachably connected to said table.

12. Apparatus as claimed in claim 11, wherein said frame includes a cross beam having two parallel vertical bores arranged at equal distances from said vertical axis, said tool head having alignment pins which are slidably displaceable in said vertical bores in the cross beam.

13. Apparatus as claimed in claim 12, wherein said cutting tool head has an axial bore therein disposed centrally between said alignment pins, a carrier unit secured to said tool head and comprising a stem secured in said axial bore of the tool head for common rotation therewith, and a crown on said stem, said alignment pins being fixed to said crown, said crown facing said cross beam with a spacing therebetween when the tool head rests on the grinding wheel.

14. Apparatus as claimed in claim 6, wherein said grinding surface has an annular portion facing said cutting tools which is inclined relative to the horizontal.

15. Apparatus as claimed in claim 14, wherein said grinding surface is formed by an abrasive lining on said grinding wheel.

16. Apparatus as claimed in claim 14, wherein said annular portion is inclined away from said cutting tools in a direction radially outwards from said vertical axis.

17. Apparatus as claimed in claim 6, wherein said guide means comprises a fixed frame having a plurality of vertical bores therein, said cutting tool head including a plurality of alignment pins slidably engaged in respective ones of said vertical bores for unrestrained vertical movement therein.

* * * * *